A. G. LASSERRE.
Coal-Agglomerating Press.

No. 168,031. Patented Sept. 21, 1875.

6 Sheets--Sheet 2.

6 Sheets--Sheet 4.

A. G. LASSERRE.
Coal-Agglomerating Press.

No. 168,031. Patented Sept. 21, 1875.

Witnesses:
A. K. Paris
H. A. Daniels

Inventor:
Antoine Germain Lasserre
By Z. C. Robbins Attorney

N. PETERS, PHOTO-LITHOGRAPHER, WASHINGTON, D. C.

6 Sheets--Sheet 5.

A. G. LASSERRE.
Coal-Agglomerating Press.

No. 168,031. Patented Sept. 21, 1875.

Witnesses:
A. K. Parris
H. A. Daniels

Inventor:
Antoine Germain Lasserre
By his Attorney J. C. Robbins

6 Sheets--Sheet 6.
A. G. LASSERRE.
Coal-Agglomerating Press.
No. 168,031. Patented Sept. 21, 1875.
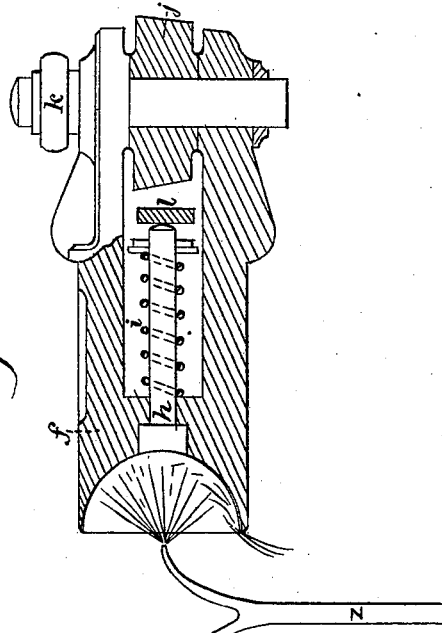
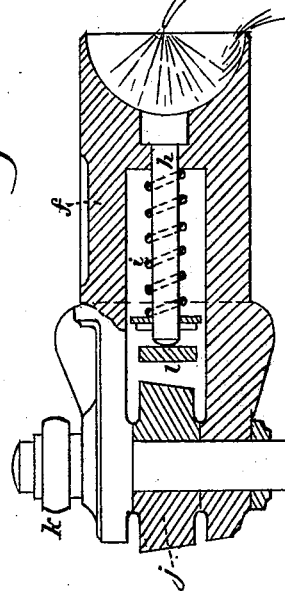
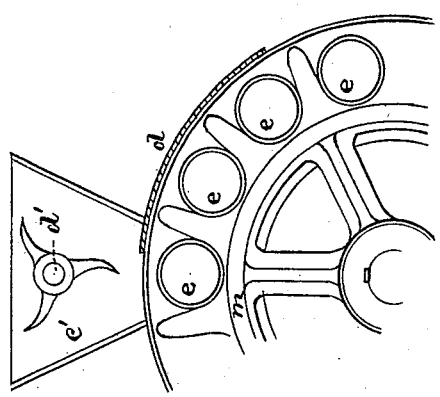
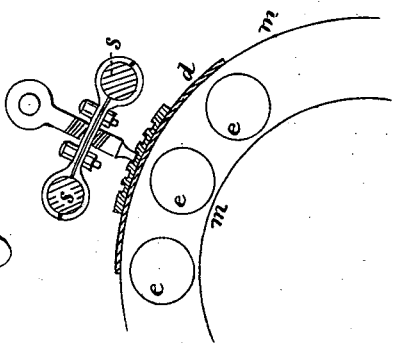
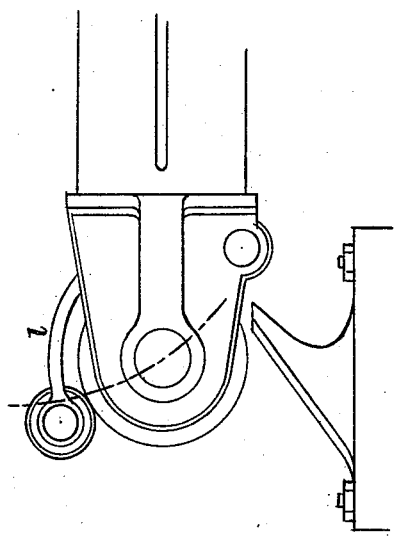

UNITED STATES PATENT OFFICE.

ANTOINE GERMAIN LASSERRE, OF PARIS, FRANCE, ASSIGNOR TO GRATIOT WASHBURNE.

IMPROVEMENT IN COAL-AGGLOMERATING PRESSES.

Specification forming part of Letters Patent No. 168,031, dated September 21, 1875; application filed July 26, 1873.

*To all whom it may concern:*

Be it known that I, ANTOINE GERMAIN LASSERRE, of Paris, France, chemist, have invented a new and Improved Rotary Molding and Compressing Apparatus, which, while it may be used for other purposes, is more particularly intended to be used for molding and compressing into balls or masses of any desired size or shape the finely-comminuted débris resulting from the handling of coal during the processes of preparing the same for market, and which is found in large quantities in the vicinity of all collieries; and I do hereby declare that the following is a full and clear description of said apparatus, reference being had to the accompanying drawings, which form a portion of this specification—

Figure 1:
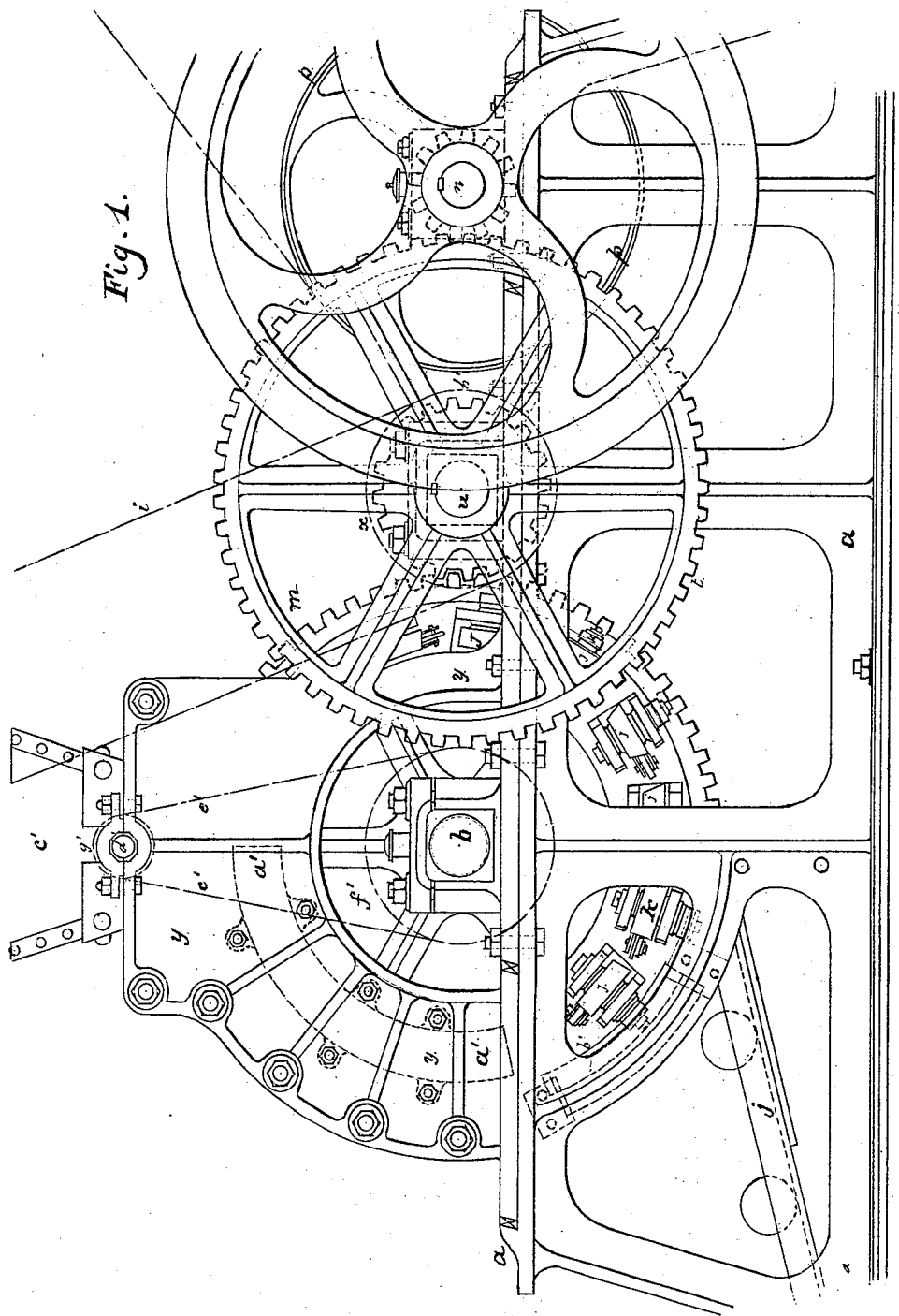
Figure 2:
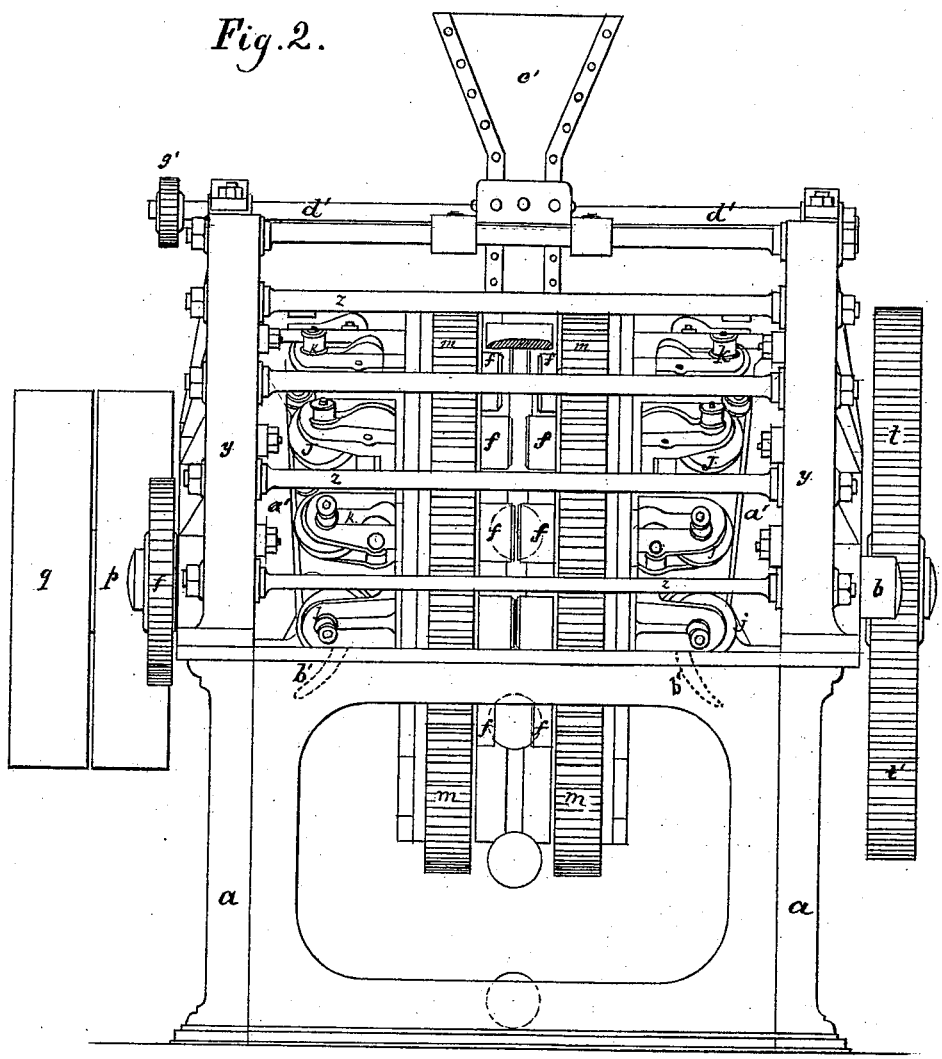
Figure 3:
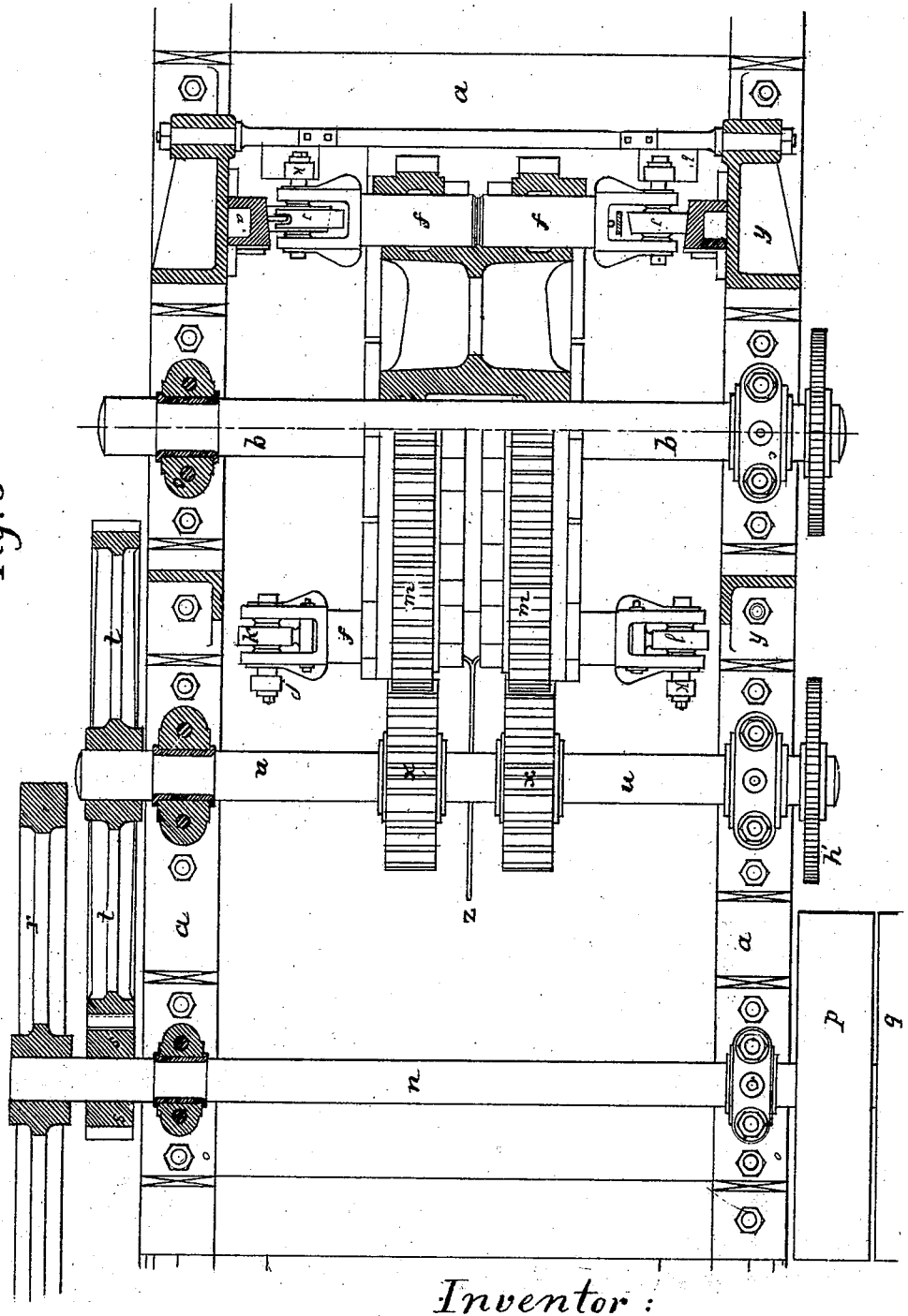
Figure 4:
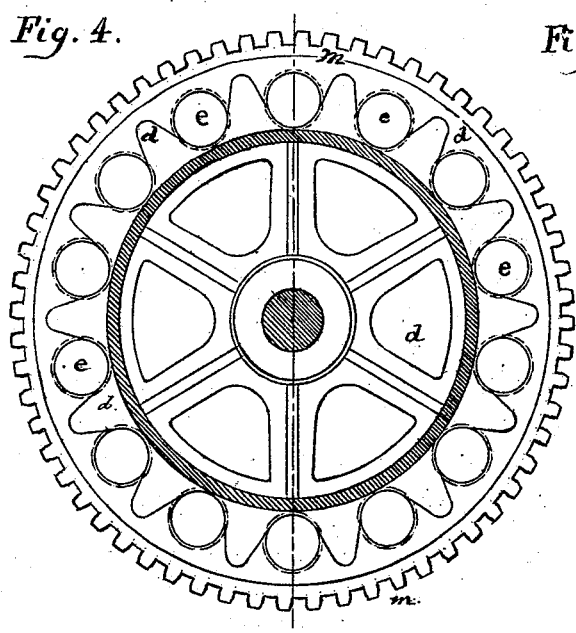
Figure 5:
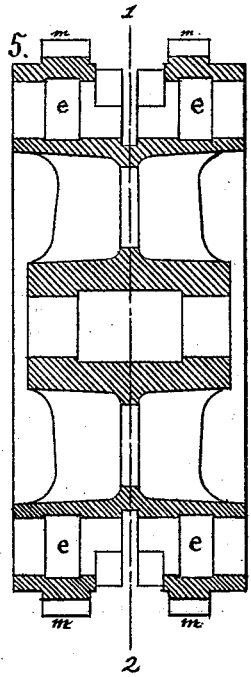
Figure 6:
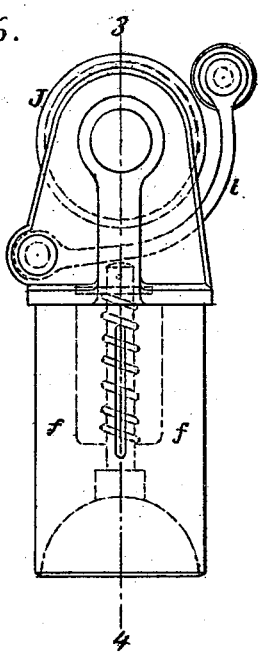
Figure 7:
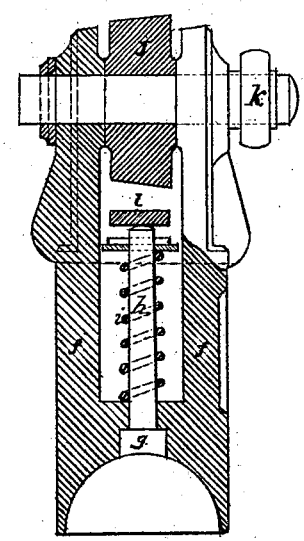
Figure 8:
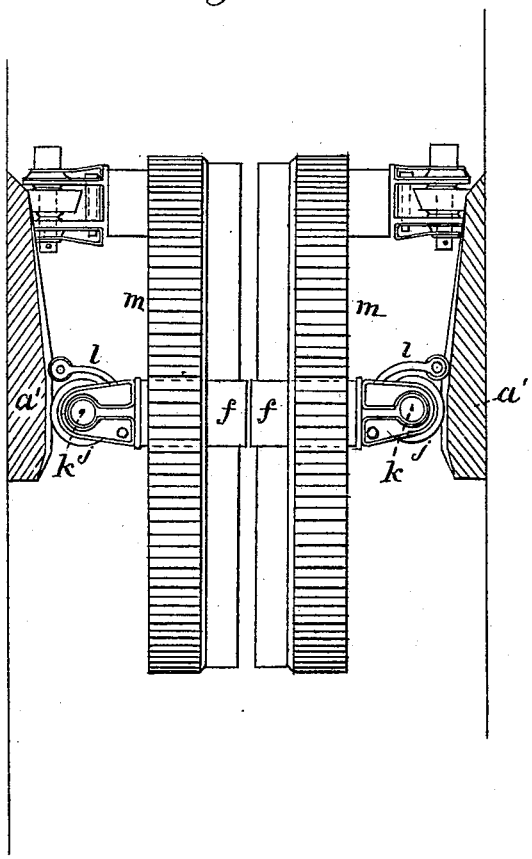

Figure 1 being a front view of said apparatus; Fig. 2, an end view of the same; Fig. 3, a plan view with some of the parts shown in section; Fig. 4, a central sectional view of the main wheel $m$ in the line 1 2 of Fig. 5; Fig. 5, a diametrical section of said wheel; Fig. 6, an enlarged side view of one of the molding and compressing pistons $f$; Fig. 7, a sectional view of said piston in the line 3 4 of Fig. 6; Fig. 8, a view of the main wheel $m$ and some of the parts combined therewith; and Figs. 9, 10, 11, 12, and 13 are views of detached portions of said apparatus.

Similar letters refer to corresponding parts in all the drawings.

The supporting-frame of the respective movements of my said molding and compressing apparatus may be constructed in the manner shown in the drawings, or in any other that may be preferred.

The main shaft $b$, which receives the main wheel $m$, works in the bearings $c$ $c$. The main wheel $m$ has a deep annular groove in its periphery, whose thick sides terminate in radial gearing-teeth, as shown in Fig. 4. The gearing-teeth of the main wheel $m$ receive the teeth of the wheel $x$ on the shaft $u$, which shaft receives power and motion from the driving-shaft $n$ by means of the gearing of the wheel $t$ on the former into the teeth of the pinion $n$ on the driving-shaft, as shown in Fig. 3. Corresponding series of horizontal apertures $e$ $e$ are formed opposite to each other in the respective sides of the groove in the main wheel $m$, for the reception and guidance in their movements of the double series of molding and condensing pistons $f$ $f$. The molding and compressing pistons $f$ are each supplied with a pivoted pressure-communicating roller, $j$, and a pivoted withdrawing-roller, $k$, as shown in Fig. 7. Inwardly each molding and compressing piston $f$ terminates in a molding-cavity of a semi-spherical shape, or other desired shape; and in a longitudinal central opening in each of said pistons a smaller piston, $h$, is placed and combined with a retracting-spring, $i$, and with a curved lever, $l$, as shown in Figs. 6 and 7. The face of the head of each of the said interior pistons $h$ forms the central portion of the cavity in the head of each of the molding and compressing pistons $f$, as shown in Fig. 7. Each curved lever $l$ passes through a slot in each of the molding and compressing pistons $f$, and its inner end is jointed to one side of said piston, as shown in Fig. 6. Said lever is placed in such a position as to bear against the inner end of the interior piston $h$, which is combined with each of the molding and compressing pistons $f$. Inclined planes $a'$ $a'$ are secured opposite to each other to the inner sides of the supporting-frame of the apparatus in such positions that the rotation of the main wheel $m$ will bring the pressure-communicating rollers $j$ $j$ of the molding and compressing pistons $f$ across the inner faces of said inclined planes, as shown in Fig. 2. The said pressure-communicating rollers $j$ $j$ will first be brought to bear against the surfaces of the inclined planes $a'$ $a'$ at or about the time that the molding and compressing pistons $f$, with which they are respectively combined, attain their highest positions during the revolution of the main wheel $m$, and, consequently, the lateral forward movement of said pistons will cause the inclined planes $a'$ $a'$ to gradually force inward said pistons until the sides of their molding-cavities shall be brought in contact with each other at the moment that the rollers $j$ $j$ reach and pass the thickest ends or heads of said inclined planes. The moment after the rollers $j$ $j$ pass from the faces of the inclined planes $a'\ a'$, the rollers $k\ k$, which are also combined with the molding and compressing pistons $f\ f$, strike against the outer surfaces of the reversed inclined planes $b'\ b'$, and their passage over the same will suddenly draw back the said molding and compressing pistons to their extreme outward positions. The instant after the rollers $j\ j$ of each pair of molding and compressing pistons $f\ f$ pass beyond the heads of the inclined planes $a'\ a'$ and commence their outward movements, the heads of the curved levers $l\ l$ of said pistons strike against the said inclined planes, and with such force as to cause the said levers to drive forward the internal pistons $h\ h$, and thereby prevent the ball of compressed fuel that has just been formed between the meeting-cavities of the said molding and compressing pistons from adhering to either of said cavities; and immediately after the heads of said curved levers $l\ l$ have passed beyond the inclined planes $a'\ a'$ the retracting-springs $i\ i$ will withdraw the said internal pistons $h\ h$ back into their normal positions within the molding and compressing pistons $f\ f$, as represented in Fig. 7. Immediately above the central portion of the main wheel $m$ a hopper, $c'$, is located, and the shaft $d'$, which passes through the throat of said hopper, is supplied with curved teeth of such shape as will prevent the sticky mass of material that is placed therein from clogging during its passage from the hopper to the groove within the periphery of the main wheel $m$. The fine coal or other similar fuel to be molded and compressed within the afore-described apparatus must be first incorporated with melted coal-tar, or some other suitable adhesive hydrocarbon, by any suitable mixing apparatus, and then, when it shall have fallen to a suitable temperature the said prepared material may be conveyed to the hopper of the apparatus by endless conductors, or by any other suitable means.

For the purpose of preventing the adhesion of any of the sticky mass of fuel operated upon by the apparatus from adhering to the cavities of the molding and compressing pistons, water must be thrown into said cavities just previous to receiving a fresh charge, and this may be accomplished by means of a double-nozzled water-pipe, $z$, Figs. 3, 9, and 10, or by any other suitable means.

A curved apron, $d$, is so secured to the frame of the machine that it closes over that portion of the groove in the main wheel $m$ within which the molding and compressing pistons $f$ are forced inward upon the moistened mass of prepared coal-dust within said groove, to convert the same into balls, said apron serving the purpose of confining the said moistened mass of coal-dust while it is being operated upon by the said molding and compressing pistons.

Figs. 12 and 13 in the accompanying drawings represent the manner of combining the said curved apron $d$ with the frame of the machine. $s\ s$, Fig. 12, are a portion of the rods, which connect the opposite sides of the frame of the apparatus to each other.

I claim as my invention—

1. The combination of the laterally and conjointly operating molding and compressing pistons $f$ with the main wheel $m$, substantially as and for the purpose herein set forth.

2. The combination of the internal pistons $h$, with the molding and compressing pistons $f$, substantially as and for the purpose herein set forth.

3. The combination of the curved levers $l$, the internal pistons $h$, and the retracting-springs $i$, with each other and with the molding and compressing pistons $f$, substantially as and for the purpose herein set forth.

4. The combination of the main wheel $d$, the molding and compressing pistons $f$, and the internal pistons $h$, with each other and with the pressure inclined planes $a'\ a'$, and the retracting inclined planes $b'\ b'$, substantially as and for the purpose herein set forth.

5. The arrangement of the curved apron $d$, with the laterally-operating pistons $f$ and the main wheel $m$, substantially as and for the purpose herein set forth.

ANTOINE GERMAIN LASSERRE.

Witnesses:
    AUGUSTUS BIESEL,
    F. FRANCIS.